(12) United States Patent
Song

(10) Patent No.: US 8,659,644 B2
(45) Date of Patent: Feb. 25, 2014

(54) STEREO VIDEO CAPTURE SYSTEM AND METHOD

(75) Inventor: Lei Song, Shenzhen (CN)

(73) Assignee: SuperD Co. Ltd., Shenzhen (CN)

(*) Notice: Subject to any disclaimer, the term of this patent is extended or adjusted under 35 U.S.C. 154(b) by 342 days.

(21) Appl. No.: 12/973,740

(22) Filed: Dec. 20, 2010

(65) Prior Publication Data

US 2012/0127271 A1    May 24, 2012

Related U.S. Application Data

(63) Continuation of application No. PCT/CN2010/079004, filed on Nov. 23, 2010.

(51) Int. Cl.
*H04N 13/02* (2006.01)
(52) U.S. Cl.
USPC .............................................. 348/46; 348/42
(58) Field of Classification Search
None
See application file for complete search history.

(56) References Cited

U.S. PATENT DOCUMENTS

2003/0026474 A1* 2/2003 Yano .............................. 382/154
2012/0044249 A1* 2/2012 Mashitani et al. ............. 345/419

* cited by examiner

*Primary Examiner* — Mehrdad Dastouri
*Assistant Examiner* — Kristin Dobbs
(74) *Attorney, Agent, or Firm* — Anova Law Group, PLLC

(57) ABSTRACT

A method is provided for a stereo video capture system. The stereo video system includes a stereo video monitor, a control platform, and a three-dimensional (3D) capture imaging device. The method includes capturing at least a first image and a second image, with a parallax between the first image and the second image based on a first parallax configuration. The method also includes receiving the first and second images; and calculating a value of at least one parallax setting parameter associated with the first and second images and corresponding to the first parallax configuration. Further, the method includes determining whether the value is within a pre-configured range. When the value is out of the pre-configured range, the method includes converting the first parallax configuration into a second parallax configuration. The method also includes sending, the second parallax configuration to the 3D imaging capture device, and adopting the second parallax configuration in operation.

14 Claims, 6 Drawing Sheets

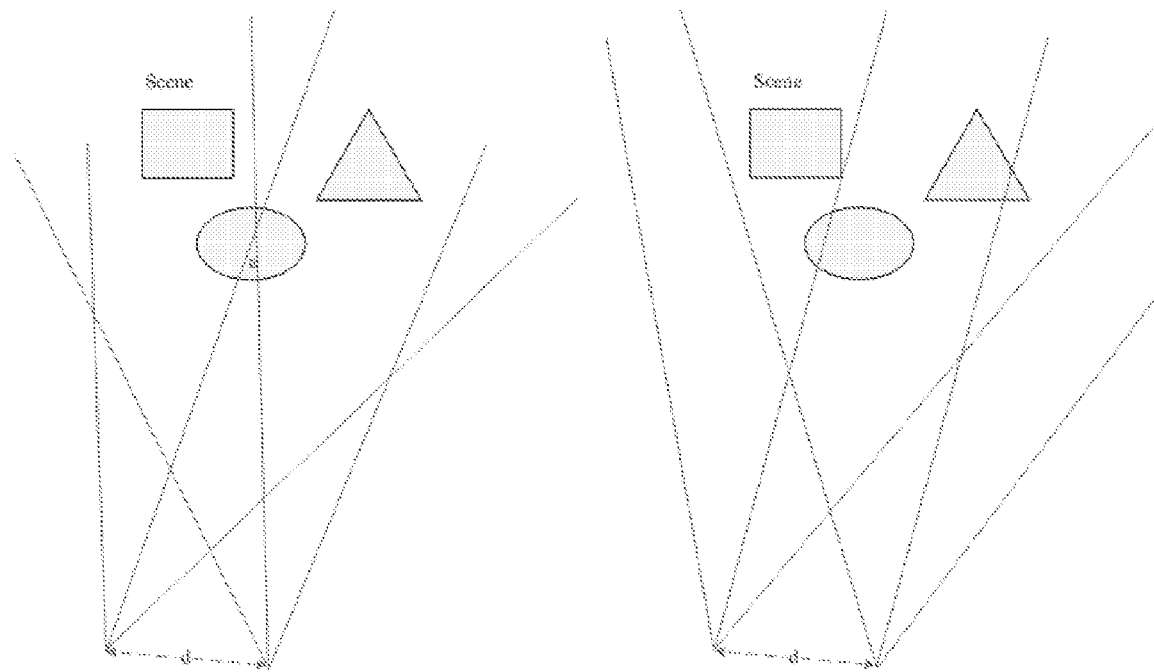
FIG. 1A  FIG. 1B
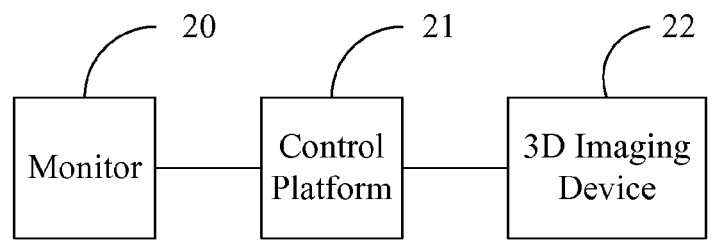
FIG. 2

STEREO VIDEO CAPTURE SYSTEM AND METHOD

CROSS-REFERENCES TO RELATED APPLICATIONS

This application claims the priority of PCT patent application no. PCT/CN2010/079004, filed on Nov. 23, 2010, the entire contents of which are incorporated herein by reference.

FIELD OF THE INVENTION

The present invention generally relates to video capture systems and, more particularly, to the methods and systems for stereo video capture and stereo three-dimensional (3D) display.

BACKGROUND

Conventional stereo video capture systems are often limited by available hardware. When using these conventional systems to capture stereo video images based on parallax, a large amount of manual corrections may be needed. Sometimes, it even requires repeated manual attempts before a video capture system can operate at a reasonable quality level. So, in many cases, the captured stereo video images may not have a desired parallax. An undesired parallax associated with stereo video images likely causes a viewer some discomfort when watching the stereo video images. Further, if the captured video image has an undesired parallax, the stereo video images may need to be corrected later, or may need to be captured later, which may result in waste of time and resources.

When shooting stereo video images using conventional systems, a stereo video monitor is often used to check the quality of the stereo video images captured by the conventional systems, such as a stereo camera, in real-time. However, when a user finds low quality stereo video images, the user needs to manually adjust the stereo camera based on the user's experience. Further, because the significant size-difference between the stereo video monitor's small monitor screen and a large screen for displaying the stereo video images to a viewer(s), it is difficult to detect certain undesired parallax that may appear in the large screen while watching the stereo video images on the small monitor screen.

The disclosed methods and systems are directed to solve one or more problems set forth above and other problems.

BRIEF SUMMARY OF THE DISCLOSURE

One aspect of the present disclosure includes a method for a stereo video capture system. The stereo video system includes a stereo video monitor, a control platform, and a three-dimensional (3D) imaging capture device. The method includes: capturing at least a first image and a second image, with a parallax between the first image and the second image based on a first parallax configuration. The method also includes receiving the first and second images; and calculating a value of at least one parallax setting parameter associated with the first and second images and corresponding to the first parallax configuration. Further, the method includes determining whether the value is within a pre-configured range. When the value is out of the pre-configured range, the method includes converting the first parallax configuration into a second parallax configuration. The method also includes sending the second parallax configuration to the 3D imaging capture device, and adopting the second parallax configuration in operation.

Another aspect of the present disclosure includes a stereo video capture system. The stereo video capture system includes a 3D imaging capture device, and a control platform. The 3D imaging capture device is configured to capture a first image and a second image, with a parallax between the first image and the second image, based on a first parallax configuration. The control platform is coupled to the 3D imaging capture device to receive the first and second images, and is configured to calculate a value of at least one parallax setting parameter associated with the first and second images and corresponding to the first parallax configuration. The control platform is also configured to determine whether the value is within a pre-configured range. Further, the control platform is configured to convert the first parallax configuration into a second parallax configuration when the value is out of the pre-configured range, and to control the 3D imaging capture device to adopt the second parallax configuration.

Another aspect of the present disclosure includes a control platform for a stereo video capture system. The control platform includes a parallax collection module, a storage module, and a parallax conversion module. The parallax collection module is configured to calculate a value of at least one parallax setting parameter associated with at least a first image and a second image, with a parallax between the first image and the second image. The first image and the second image are captured by a three-dimensional (3D) imaging device based on a first parallax configuration. Further, the storage module is configured to store a pre-configured range of the parallax setting parameter. The parallax conversion module is configured to determine whether the value is within the pre-configured range. When the value is out of the pre-configured range, the parallax conversion module is configured to convert the first parallax configuration into a second parallax configuration; and to control the 3D imaging capture device to adopt the second parallax configuration.

Another aspect of the present disclosure includes a 3D imaging capture device for a stereo video capture system. The 3D imaging capture device includes a 3D imaging module, a video interface, and a 3D imaging servo system. The 3D imaging module is configured to capture at least a first image and a second image based on a first parallax configuration, with a parallax between the first image and the second image. The video interface is configured to send out the first image and the second image. Further, the 3D imaging servo system is configured to receive control commands containing a second parallax configuration associated with the first and second images, when a current value of the parallax setting parameter is out of a pre-configured range. In addition, the 3D imaging module is coupled to the 3D imaging servo system to capture images based on the second parallax configuration.

Other aspects of the present disclosure can be understood by those skilled in the art in light of the description, the claims, and the drawings of the present disclosure.

BRIEF DESCRIPTION OF THE DRAWINGS

FIG. 1A illustrates certain parameters in calculating the parallax consistent with the disclosed embodiments;

FIG. 1B illustrates certain parameters in calculating the parallax consistent with the disclosed embodiments;

FIG. 2 illustrates a block diagram of an exemplary stereo video capture system consistent with the disclosed embodiments;

DETAILED DESCRIPTION

Figure 3:
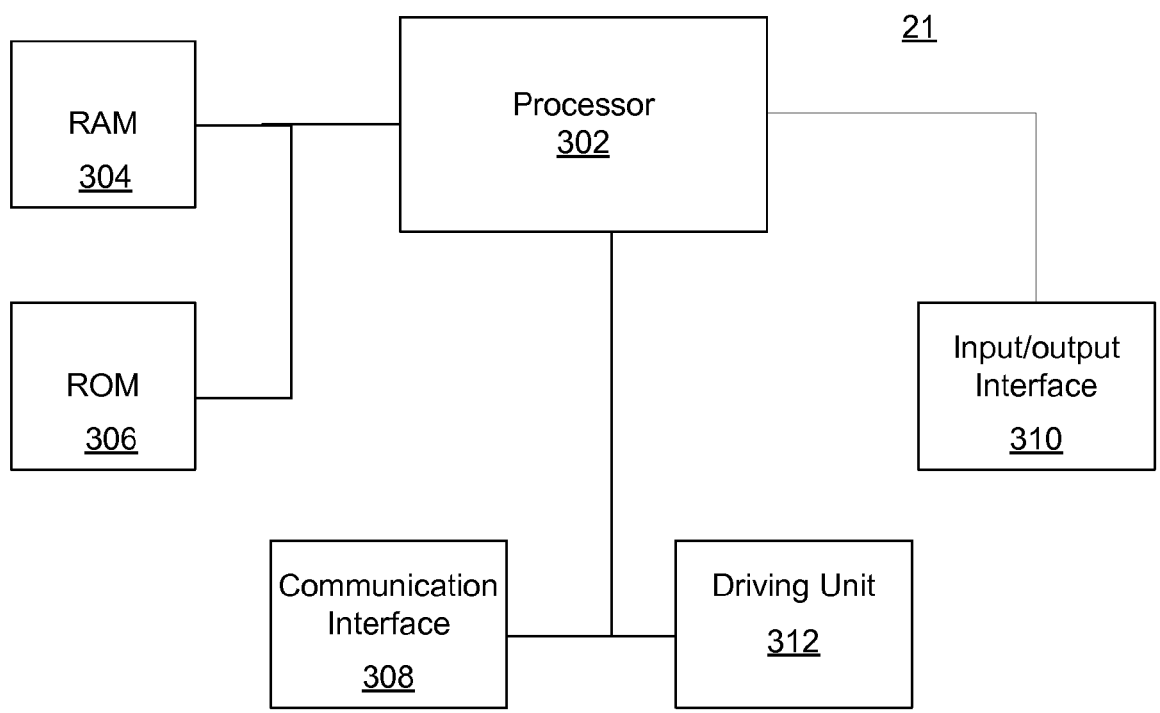
FIG. 3 illustrates a block diagram of a control platform consistent with the disclosed embodiments.

Reference will now be made in detail to exemplary embodiments of the invention, which are illustrated in the accompanying drawings. Wherever possible, the same reference numbers will be used throughout the drawings to refer to the same or like parts.

FIG. 2 illustrates an exemplary stereo video capture system 200. As shown in FIG. 2, stereo video capture system 200 includes a stereo video monitor 20, a control platform 21, and a 3D imaging capture device 22. Other components or devices may be added without departing the principles of the disclosed embodiments. Stereo video capture system 200 is capable of taking stereo or three-dimensional (3D) video images using 3D imaging capture device 22. A 3D image includes at least an image to be viewed by a viewer's left eye (i.e., the left image) and an image to be viewed by the viewer's right eye (i.e., the right image). A certain parallax or disparity exists between the left image and the right image such that the viewer can perceive the 3D image.

The stereo format 3D images are used for illustrative purposes in this disclosure. Stereo video capture system 200 may generate other formats of 3D images, such as multiple viewpoint 3D images, which may include a plurality of images, each corresponds to a different viewpoint and a certain parallax may be maintained between images of neighboring viewpoints to perceive 3D display.

3D imaging capture device 22 is used to capture different scenes to create at least two images (e.g., the left image and the right image) separated with a certain parallax. The parallax may be calculated based on certain parameters. FIGS. 1A and 1B illustrate certain parameters in calculating the parallax. As shown in FIG. 1B, when 3D imaging capture device 22 is configured horizontally, that is, two positions for respectively taking the left image and the right image are arranged horizontally, only horizontal distance 'd' between the two image-taken positions is involved in calculating the parallax. Otherwise, as shown in FIG. 1A, the angle 'a' between a target object to the two positions (i.e., the top angle) and the horizontal distance 'd' are both involved in calculating the parallax.

Returning to FIG. 2, stereo video monitor 20 may include any appropriate type of display device for viewing 3D video images. For example, stereo video monitor 20 may include a stereoscopic display requiring viewers to wear 3D glasses or an autostereoscopic display to be viewed via naked eyes. Further, stereo video monitor 20 may be a standalone display device or may be integrated into 3D imaging capture device 22 or control platform 21. During operation, a user may use stereo video monitor 20 to display and monitor 3D video images captured by 3D imaging capture device 22.

Stereo video monitor 20 and 3D imaging capture device 22 may be coupled to control platform 21 via various types of links, such as data and control buses based on universal serial bus (USB) standard, IEEE 1394 standard, or other communication standards. Further, both wired and wireless links may be used.

3D imaging capture device 22 may include any appropriate type of camera or other device capable of taking 3D video images. For example, 3D imaging capture device 22 may include double-lens camera or a single-lens camera. Whether using a single lens, two lens, or multiple lens, 3D imaging capture device 22 may take left images from a first position and right images from a second position so as to create a parallax based on the distance between the two positions and the distance between 3D imaging capture device 22 to target objects. 3D imaging capture device 22 may also take multiple images from multiple corresponding view points or positions. At least two viewpoint (stereo) images are provided by 3D imaging capture device 22.

Further, control platform 21 may provide control functions to stereo video capture system 200. For example, control platform 21 may control the operation of stereo video capture system 200 and may also control 3D imaging capture device 22 based on certain parameters such as the parallax generated by 3D imaging capture device 22. Control platform 21 may include any appropriate data processing device, such as a computer or any microprocessor-based system. FIG. 3 shows an exemplary block diagram of control platform 21.

As shown in FIG. 3, control platform 21 may include a processor 302, a random access memory (RAM) unit 304, a read-only memory (ROM) unit 306, a communication interface 308, an input/output interface unit 310, and a driving unit 312. Other components may be added and certain devices may be removed without departing from the principles of the disclosed embodiments.

Processor 302 may include any appropriate type of graphic processing unit (GPU), general purpose microprocessor, digital signal processor (DSP) or microcontroller, and application specific integrated circuit (ASIC). Processor 302 may execute sequences of computer program instructions to perform various processes associated with system 200. The computer program instructions may be loaded into RAM 304 for execution by processor 302 from read-only memory 306.

Communication interface 308 may provide communication connections such that system 200 may be accessed remotely and/or communicate with other systems through computer networks or other communication networks via various communication protocols, such as transmission control protocol/internet protocol (TCP/IP), hyper text transfer protocol (HTTP), etc.

Input/output interface 310 may be provided for users to input information into system 200 or for the users to receive information from system 200. For example, input/output interface 310 may include any appropriate input device, such as a remote control, a keyboard, a mouse, an electronic tablet, voice communication devices, or any other optical or wireless input devices. Further, driving unit 312 may include any appropriate driving circuitry to drive various devices.

Returning to FIG. 2, although control platform 21 as shown may be implemented as a separate system, control platform 21 may also be integrated into 3D imaging capture device 22 and may further coincide with a control device of 3D imaging capture device 22. Further, control platform 21 may also be implemented in software running on a separate computer system or in stereo video monitor 20 or 3D imaging capture device 22. Other implementations may also be used.

Figure 4:
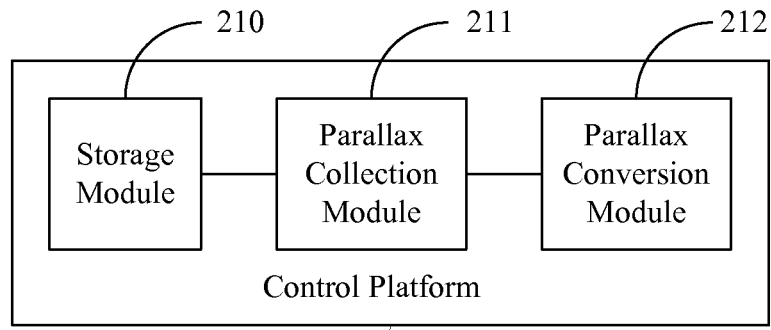
FIG. 4 illustrates a functional block diagram of a control platform consistent with the disclosed embodiments.

FIG. 4 shows an exemplary functional block diagram of control platform 21 consistent with the disclosed embodiments. As shown in FIG. 4, control platform 21 may include a storage module 210, a parallax collection module 211, and a parallax conversion module 212. Other components may also be added.

Storage module 210 may include registers, variables, a memory unit, or any appropriate hardware or software device for storing system information. For example, storage module 210 may be used to store pre-configured values or ranges of parallax or parallax setting parameters associated with at least two images (e.g., the left image and the right image) of a 3D image. Parallax setting parameters, as used herein, may refer to certain parameters related to operation of 3D imaging capture device 22 to control the parallax between the two or more images of the 3D image. That is, parameters setting parameters correspond to the parallax provided by 3D imaging capture device 22, and may be referred to as a parallax configuration for 3D imaging capture device 22.

For example, the parallax setting parameters may include a horizontal distance 'd' between two image-taken positions and/or a top angle 'a' between the two image-taken positions and a target object. In certain embodiments, a pre-configured range for the horizontal distance 'd' and/or a pre-configured range for the top angle 'a' may be stored in control platform 21 (e.g., storage module 210). The pre-configured range may include a continuous range of values or a discrete range of values. For example, a pre-configured range for the horizontal distance 'd' may be set to any value between 51 mm to 65 mm, or the pre-configured range for the horizontal distance 'd' may be set to any integers between 51 mm to 65 mm. Similarly, a pre-configured range for the top angle 'a' can also include a continuous range of values or a discrete range of values.

Parallax collection module 211 may be used to obtain current values of the parallax setting parameters or parallax configuration associated with the two images generated by 3D imaging capture device 22. For example, parallax collection module 211 may match the two images to derive depth information, and may calculate current values of the parallax setting parameters based on the depth information and a relationship between the depth and the parallax setting parameters.

Further, parallax conversion module 212 may be used to determine whether the parallax configuration or parallax setting parameters are within the pre-configured range. When the parallax configuration or parallax setting parameters are out of the pre-configured range, parallax conversion module 212 may convert the current values of parallax setting parameters to a different set of values. In other words, parallax conversion module 212 may convert a first parallax configuration to a second parallax configuration when the parallax setting parameters or parallax is out of the pre-configured range. The converted parallax setting parameter values may be sent to 3D imaging capture devices 22 as control signals. Other parallax configurations may also be sent as control signals between control platform 21 and 3D imaging capture device 22.

In operation, parallax collection module 211 may obtain parallax and/or or derive parallax setting parameters based on particular matching algorithm(s). For example, parallax collection module 211 may obtain a parallax between at least two corresponding images using two-view stereo matching or multi-view stereo matching. Further, two-view stereo matching may include area-based two-view stereo matching and feature-based two-view stereo matching, etc. Multi-view stereo matching may include horizontal multi-view stereo matching, orthogonal three-view stereo matching, random dot three-view stereo matching, and orthogonal multi-view stereo matching. Further, the parallax may be a relative parallax or an absolute parallax, and parallax collection module 211 may convert the relative parallax into the absolute parallax.

When using an area-based two-view stereo matching algorithm to obtain the parallax between two images (e.g., a left image and a right image), parallax collection module 211 may select an image feature corresponding to an actual physical structure from one image (e.g., the left image) obtained by 3D imaging capture device 22. Parallax collection module 211 may further determine an image feature corresponding to the same actual physical structure in the other image (e.g., the right image). Thus, parallax collection module 211 may determine relative positions between the image features of the two images corresponding to the same physical structure so as to obtain the relative parallax between the two images.

When using an area-based multi-view stereo matching algorithm to obtain the parallax, parallax collection module 211 may use a local window matching method. According to color information (gray information) of the images, parallax collection module 211 may use similarity of local windows to perform the matching. The similarity may be measured by a similarity measure function based on a self-adapting dissimilarity measure. The self-adapting dissimilarity measure combines sum of absolute differences (SAD) and absolute gradient differences two factors, which may significantly improve robustness of parallax calculation. The self-adapting dissimilarity measure function is represented as:

$$C(x,y,d)=(1-\omega)C_{SAD}(x,y,d)+\omega C_{GRAD}(x,y,d)$$

where x, y are coordinates of a matching point or pixel, and d is the disparity or parallax, $\omega$ is a weight factor, and $$C_{SAD}(x, y, d) = \sum_{(i,j)\in N(x,y)} |I_1(i, j) - I_2(i+d, j)|$$

$$C_{GRAD}(x, y, d) = \sum_{(i,j)\in N(x,y)} |\nabla_x I_1(i, j) - \nabla_x I_2(i+d, j)| + \sum_{(i,j)\in N(x,y)} |\nabla_y I_1(i, j) - \nabla_y I_2(i+d, j)|$$

where I represents intensity, subscript 1 and 2 refers to the first (e.g., left) image and the second (e.g., right) image, N(x, y) is a 5×5 size window surrounding the matching point (x, y), i and j are coordinates of points of the window, $\nabla_x$ represents a horizontal component of image gradient, and $\nabla_y$ represents a vertical component of the image gradient.

Further, a bidirectional matching method may be used to remove mistakenly matched points. For example, if the left image is used as a reference, and the right image is used as a target, parallax collection module 211 may perform a matching from left to right to obtain a left-to-right disparity or parallax. Further, if the right image is used as the reference, and the left image as the target, parallax collection module 211 may perform a matching from right to left to obtain a right-to-left disparity or parallax.

Because the matching from left to right and the matching from right to left both matches against the same object or local window, the disparity from the left-to-right matching and the disparity from the right-to-left matching are the same for any non-blocking matching area. Any difference between the disparity from the left-to-right matching and the disparity from the right-to-left matching may indicate a blocking area.

To remove mismatching points, referring the disparity from left to right as $d_{LR}$, and the disparity from right to left as $d_{RL}$. Further, if a pixel $(x_L, y)$ on the left image and a pixel $(x_R, y)$ on the right image are a pair of matching points, the disparity from left to right as $d_{LR}(x_L, y)$, and the disparity from right to left as $d_{RL}(x_R, y)$. The following formula or algorithm may then be used to remove mismatched points (only horizontal disparity is considered here, other disparities may also be used):

$$d_{LR}(x_L, y) = d_{RL}(x_R, y) = \begin{cases} \dfrac{d_{LR}(x_L, y) + d_{RL}(x_R, y)}{2} & \text{if } |d_{LR}(x_L, y) - d_{RL}(x_R, y)| \le \lambda \\ 0 & \text{else} \end{cases}$$

where $x_R = x_L + d_{LR}(x_L, y)$, and $\lambda$ is a predetermined threshold value.

When $|d_{LR}(x_L, y) - d_{RL}(x_R, y)| \le \lambda$, the matching points $(x_L, y)$ and $(x_R, y)$ are considered as correctly matched points; on the other hand, if the disparity between the left image and the right image does not satisfy $|d_{LR}(x_L, y) - d_{RL}(x_R, y)| \lambda$, the matching points $(x_L, y)$ and $(x_R, y)$ are considered as mismatched points. For mismatched points, the disparity between the two points is set to '0'.

Accordingly, two separate disparity map (i.e., a map containing pixels or points of an image with respective disparity values) $d_{LR}(x_L, y)$ and $d_{RL}(x_R, y)$ for all points from the left image and the right image may be established with the mismatched points set to 0. Further, a reference disparity map $I(x, y)$ may be created by integrating the two separate disparity images by:

$$I(x, y) = \begin{cases} (1-\alpha)I_{LI}(x, y) + \alpha I_{RI}(x, y) & \text{if } |I_{LI}(x, y) - I_{RI}(x, y)| \le \delta \\ I_{LI}(x, y) & \text{if } I_{RI}(x, y) \text{ has no matching value} \\ I_{RI}(x, y) & \text{if } I_{LI}(x, y) \text{ has no matching value} \\ 0 & \text{else} \end{cases}$$

where $$\alpha = \frac{|t - t_L|}{|t - t_L| + |t - t_R|},$$

$\delta$ is a predetermined threshold, and t is a shifting vector of a outside parameter matrix of 3D imaging capture device 22, $I_{LI}(x, y)$ and $I_{RI}(x, y)$ denote the disparity map corresponding to adjacent left and right images with respect to the reference disparity map.

The reference disparity map may be further improved by removing other undesired points or pixels, such as an outlier. For example, the reference map may be separated into a plurality of sections, and assuming that pixels in each section may have same disparity. Thus, for each separated section, an average disparity among all pixels in the section may be calculated and used as the disparity for the particular section. The calculation can be represented as:

$$I_{SEG}(x, y) = \underset{(x, y) \in A_{SEG}(x, y)}{\text{median}} (I(x, y))$$

where $A_{SEG}(x, y)$ refers a separate section.

This improvement may be performed independently before calculating disparity value or after the reference disparity map is created. Other methods may also be used.

Figure 5:
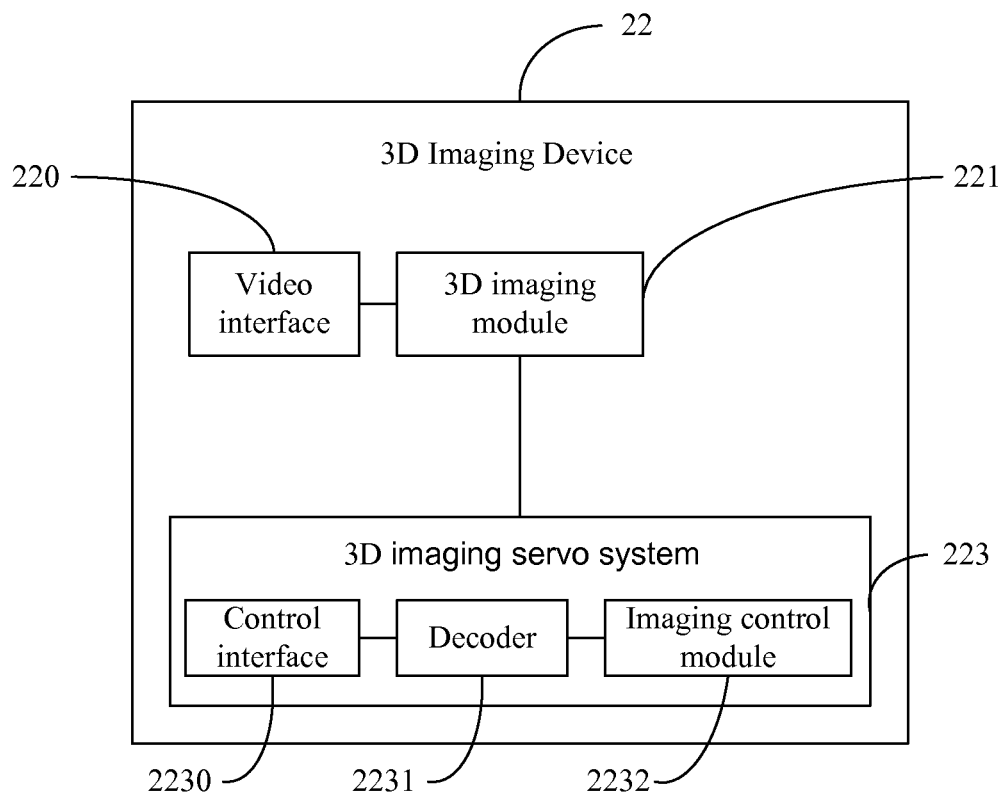
FIG. 5 illustrates a functional block diagram of a 3D imaging capture device consistent with the disclosed embodiments.

FIG. 5 shows an exemplary block diagram of 3D imaging capture device 22 consistent with the disclosed embodiments. As shown in FIG. 5, 3D imaging capture device 22 includes a video interface 220, a 3D imaging module 221, and a 3D imaging servo system 223. Video interface 220 may be used to transmit video images to control platform 21. Video interface 220 may also be connected with 3D imaging module 221.

3D imaging module 221 may generate at least two images of a 3D video image based on configurations and/or parallax setting parameters. Further, 3D imaging servo system 223 may be coupled to control platform 21 and 3D imaging module 221 to provide control instructions and/or other control information. For example, 3D imaging servo system 223 may receive a parallax configuration or parallax setting parameters indicating a converted parallax configuration and/or other parameters, and control 3D imaging module 221 based on the received parallax setting parameters to adjust the operation of 3D imaging module 221 so as to capture the at least two images of the 3D video image based on the converted parallax configuration.

3D imaging servo system 223 may include a control interface 2230, a decoder 2231, and an imaging control module 2232. Control interface 2230 can be a USB interface, an IEEE 1394 interface, or any other interface type. Control interface 2230 may be coupled with control platform 21 to receive instructions from control platform 21. For example, control interface 2230 may receive one or more parallax control commands from control platform 21. Control interface 2230 may also be coupled with decoder 2231 such that encoded control commands from control platform 21 may be decoded by decoder 2231.

Further, imaging control module 2232 may be coupled to decoder 2231 to receive decoded parallax control commands. Based on the control commands, imaging control module 2232 controls 3D imaging module 221 to effect the parallax control (i.e., using a new parallax configuration to capture images). In addition, these various control functions may be implemented by hardware (e.g., a system similar to FIG. 3) or software or a combination of hardware and software. Imaging control module 2232 and decoder 2231 may be coupled via an inter-integrated circuit (I²C) bus, a universal asynchronous receiver/transmitter (UART) bus, or a RS232 bus, etc. Decoder 2231 is responsible for converting a USB signal or an IEEE 1394 signal into an I²C, UART, or RS232 signal and then sending the 120, UART, or RS232 signal to imaging control module 2232. The I²C, UART, or RS232 signal may contain specific values of parallax setting parameters.

Figure 6:
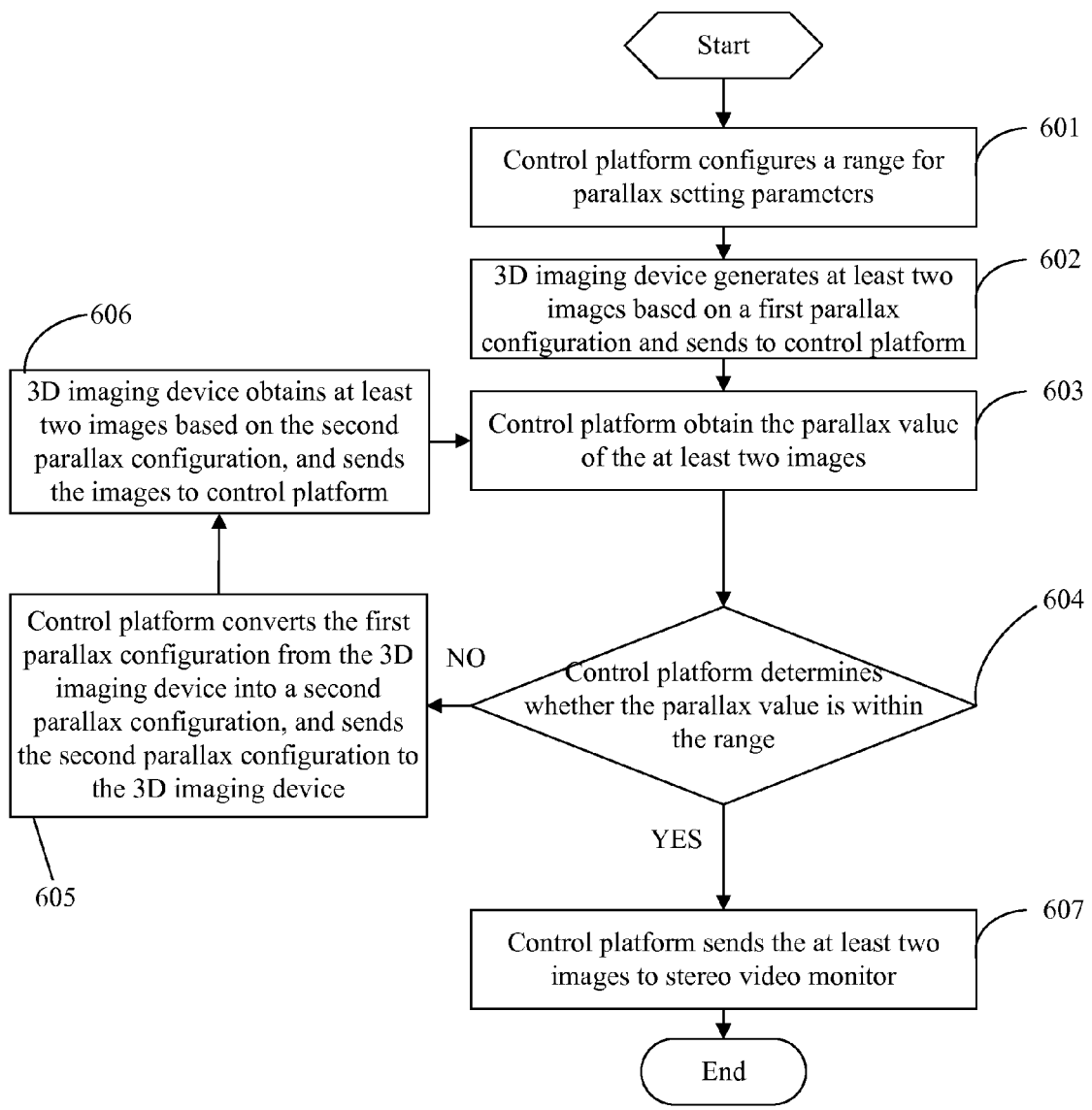
FIG. 6 illustrates an exemplary operational process consistent with the disclosed embodiments.

FIG. 6 illustrates an exemplary operational procedure by stereo video capture system 200. As shown in FIG. 6, control platform 21 may configure a range for certain parallax setting parameters corresponding to the parallax between at least two images of a 3D image generated by 3D imaging capture device 22 (601). In particular, parallax collection module 211 of control platform 21 may configure the range for the certain parallax setting parameters. For example, parallax collection module 211 may set a range for the horizontal distance 'd' between two image-taken positions of 3D imaging capture device 22, and/or a range for the top angle 'a' between the two positions and a target object.

In certain embodiments, parallax collection module 211 may set the range of the horizontal distance as a continuous range of values or a discrete range of values. For example, as explained previously, a pre-configured range for the horizontal distance 'd' may be set to any value between 51 mm to 65 mm, or the pre-configured range for the horizontal distance 'd' may be set to any integers between 51 mm to 65 mm. Similarly, a pre-configured range for the top angle 'a' can also include a continuous range of values or a discrete range of values. Further, parallax collection module 211 may configure the ranges based on pre-determined values stored in stereo video capture system 200 or based on user inputs. Parallax collection module 211 may also store the configured ranges and other parameters in storage module 210.

3D imaging capture device 22 may take at least two video images (e.g., a left image and a right image) of a 3D image of the target object based on a current or a first parallax configuration and send the two video images to control platform 21 (602). In particular, 3D imaging module 221 of 3D imaging capture device 22 may create the at least two images with a certain amount of parallax corresponding to the parallax configuration. The two video images may then be transmitted to control platform 21 via video interface 220 of 3D imaging capture device 22.

Further, after receiving the video images, control platform 21 may determine the parallax between the at least two images. That is, control platform 21 may derive or determine values of parallax setting parameters associated with the two images (603). In particular, parallax collection module 211 of control platform 21 may determine the values of parallax setting parameters. For example, parallax collection module 211 may perform a match between the two images to obtain depth information and to derive values of the parallax setting parameters based on the depth information and the relationship between the depth and the parallax setting parameters.

Control platform 21 may also determine whether the values of parallax setting parameters of the two images within the corresponding pre-configured ranges (604). In particular, parallax conversion module 212 of control platform 21 may compare the values with previously configured ranges stored in storage module 210. For example, parallax conversion module 212 may compare the value of the parallax between the two images with a preconfigured parallax range, or parallax conversion module 212 may compare the value of the horizontal distance 'd' with the pre-configured range. Optionally, if 3D imaging capture device 22 is not arranged horizontally, parallax conversion module 212 may determine whether the top angle 'a' is within the pre-configured range.

If parallax conversion module 212 determines that the values of parallax setting parameters are within the range (604, YES), control platform 21 may send the received at least two images to stereo video monitor 20 (607). Optionally, control platform 21 may combine the two images into a 3D image and transmit the 3D image to stereo video monitor 20.

On the other hand, if parallax conversion module 212 determines that the values of parallax setting parameters are out of the range (604, NO), control platform 21 may convert the current or the first parallax configuration (e.g., parallax setting parameters) into a target or a second parallax configuration, i.e., change the current set of values of parallax setting parameters to a target set of values of parallax setting parameters, and send one or more control commands containing the second parallax configuration to 3D imaging capture device 22 (605). In particular, parallax conversion module 212 may convert the current parallax configuration based certain algorithms or criteria, as shown in FIG. 7.

Figure 7:
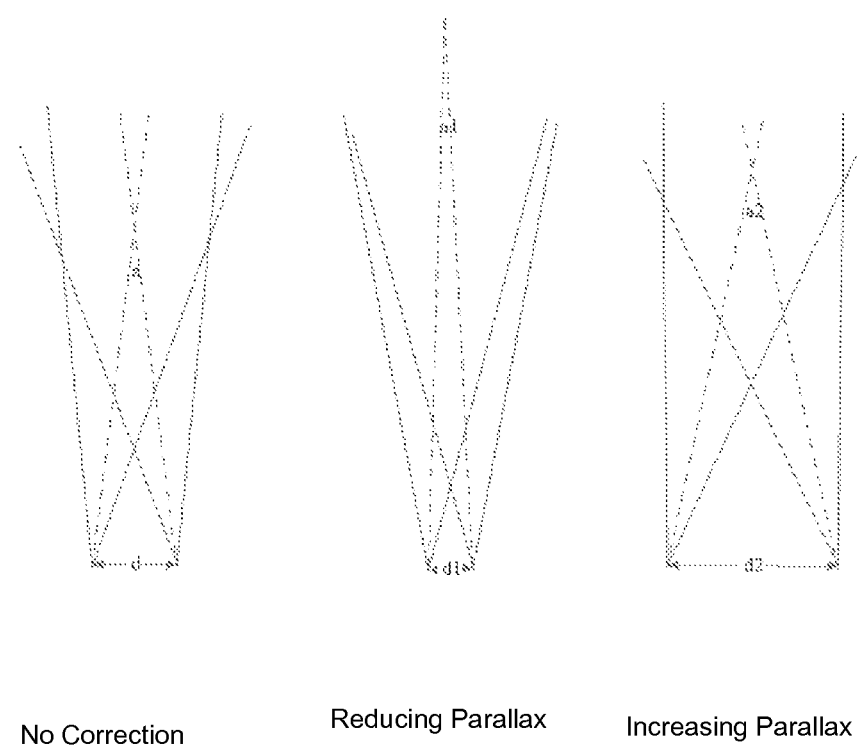
FIG. 7 illustrates certain parameters in converting parallax configurations consistent with the disclosed embodiments.

For example, as shown in FIG. 7, control platform 21 may obtain the parallax between the at least two images from 3D imaging capture device 22 as horizontal distance 'd' and top angle 'a'. Thus, the current parallax configuration based on which 3D imaging capture device 22 captures the at least two images also includes horizontal distance 'd' and top angle 'a'. Further, if the current horizontal distance 'd' and top angle 'a' are greater than the pre-configured ranges, parallax conversion module 212 may convert horizontal distance 'd' and top angle 'a' to a smaller horizontal distance 'd1' and a smaller top angle 'a1', respectively, to reduce the parallax of the two images. After 3D imaging capture device 22 receives the converted parallax setting parameters, the parallax between the at least two images generated by 3D imaging capture device 22 is thus as horizontal distance 'd1' and top angle 'a1'.

Also, if the current horizontal distance 'd' and top angle 'a' are smaller than the pre-configured ranges, parallax conversion module 212 may convert horizontal distance 'd' and top angle 'a' to a larger horizontal distance 'd2' and to a larger top angle 'a2' to increase the parallax of the two images. After 3D imaging capture device 22 receives the converted parallax setting parameters, the parallax between the at least two images generated by 3D imaging capture device 22 is thus as horizontal distance 'd2' and top angle 'a2'.

Returning to FIG. 6, parallax conversion module 212 may also convert the adjustments to the parallax setting parameters into the control commands. Parallax conversion module 212 may also encode the control commands and send the encoded control commands to 3D imaging capture device 22 via control interface 2230.

3D imaging capture device 22 receives the encoded control commands (606). Further, decoder 2231 decodes the encoded control commands and transmits the decoded control commands to imaging control module 2232.

After receiving the control commands with the target or the second parallax configuration, imaging control module 2232 may determine proper instructions to control 3D imaging module 221 as to realize or implement the conversion to the parallax configuration or the parallax setting parameters. 3D imaging module 221 may also create at least two new video images based on the second parallax configuration or new settings of the parallax setting parameters (606). The at least two video images are then transmitted to control platform 21 and control platform 21 may continue operation in 603.

Figure 8:
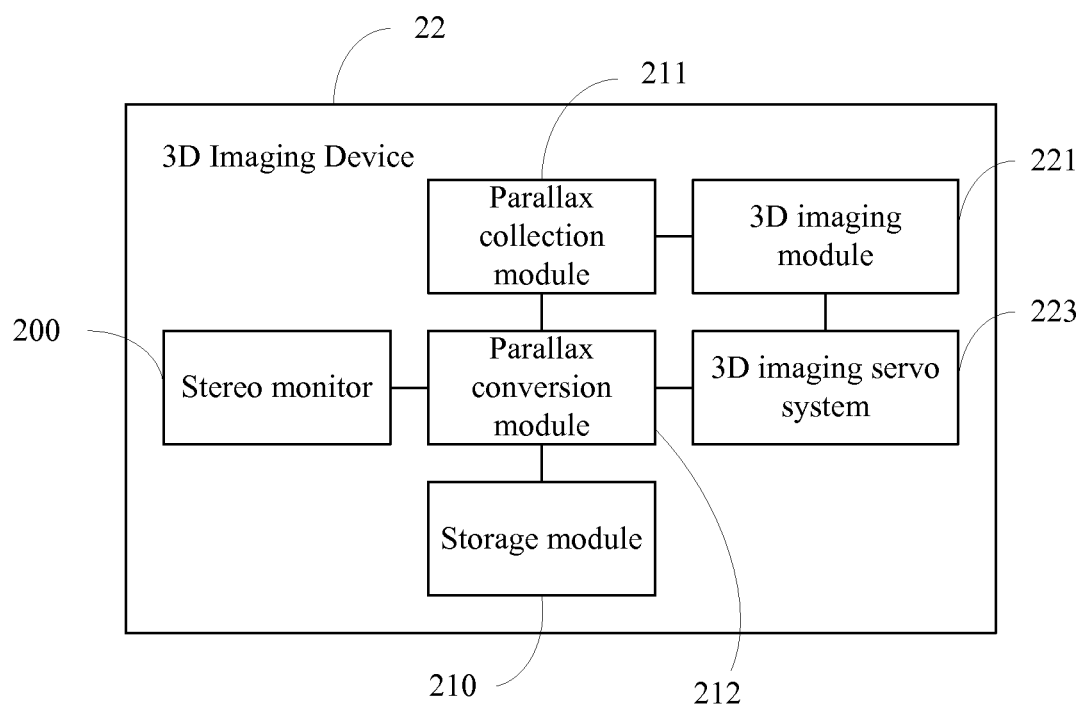
FIG. 8 illustrates a block diagram of a 3D imaging capture device consistent with the disclosed embodiments.

FIG. 8 shows another exemplary configuration of 3D imaging capture device 22 consistent with the disclosed embodiments. As shown in FIG. 8, 3D imaging capture device 22 may integrate functionalities of other devices such as stereo monitor 20 and control platform 21. More particularly, 3D imaging capture device 22 may include a stereo monitor 200 (similar to stereo monitor 20), parallax collection module 211, parallax conversion module 212, and storage module 210 (similar to control platform 21, 3D imaging module 221 and 3D imaging servo system 223. However, because the integrated components as shown in FIG. 8 are included in a same device, previously included interface-related components such as video interface 220, control interface 2230, and decoder 2231 may be omitted to improve cost efficiency and reduce complexity.

By automatically converting parallax-related parameters associated with 3D images in real-time, the disclosed systems and methods may make easy for photographers to obtain desired 3D video images while capturing the 3D video images, thus avoid after-capture parallax correction and may significantly increase efficiency.

What is claimed is:

1. A method for a stereo video capture system including a stereo video monitor, a control platform, and a three-dimensional (3D) imaging capture device, the method comprising:

capturing, by the 3D imaging capture device, at least a first image and a second image, with a parallax between the first image and the second image based on a first parallax configuration;

receiving, by the control platform, the first and second images;

calculating, by the control platform, a value of at least one parallax setting parameter associated with the first and second images and corresponding to the first parallax configuration, wherein the at least one parallax setting parameter includes a distance between two image-taken positions of the first image and the second image, respectively;

determining, by the control platform, whether the value is within a pre-configured range;

when the value is out of the pre-configured range, converting, by the control platform, the first parallax configuration into a second parallax configuration;

sending, by the control platform, the second parallax configuration to the 3D imaging capture device;

adopting, by the 3D imaging capture device, the second parallax configuration in operation;

using, by the control platform, the first image as a reference and the second image as a target to perform a first matching from left to right to obtain a left-to-right parallax;

using, by the control platform, the second image as a reference and the first image as a target to perform a second matching from right to left to obtain a right-to-left parallax;

determining, by the control platform, a disparity between the left-to-right parallax and the right-to-left parallax;

removing, by the control platform, mismatched pixels based on the disparity; and provided that a pixel $(x_L, y)$ on the left image and a pixel $(x_R, y)$ on the right image are a pair of matching points, the left-to-right parallax is denoted as $d_{LR}(x_L, y)$, and the right-to-left parallax is denoted as $d_{RL}(x_R, y)$, $x_R = x_L + d_{LR}(x_L, y)$, and $\lambda$ is a predetermined threshold value; determining, by the control platform, that the matching points $(x_L, y)$ and $(x_R, y)$ are mismatched when $|d_{LR}(x_L, y) - d_{RL}(x_R, y)| \leq \lambda$ is not satisfied.

2. The method according to claim 1, further including pre-configuring, by the control platform, the range of the at least one parallax setting parameter.

3. The method according to claim 1, wherein adopting the second parallax configuration in operation includes:
capturing, by the 3D imaging capture device, at least two new images based on the second parallax configuration; and
sending, by the 3D imaging capture device, the at least two new images to the control platform.

4. The method according to claim 1, wherein calculating the value further includes
determining the parallax between the first image and the second image based on one of a two-view stereo matching algorithm and a multi-view stereo matching algorithm.

5. The method according to claim 1, wherein
when the value is within the pre-configured range, sending, by the control platform, the first image and the second image to the stereo video monitor for display.

6. A stereo video capture system, comprising:
a three-dimensional (3D) imaging capture device configured to capture at least a first image and a second image, with a parallax between the first image and the second image, based on a first parallax configuration;

a control platform coupled to the 3D imaging capture device to receive the first and second images,
wherein the control platform is configured to:
calculate a value of at least one parallax setting parameter associated with the first and second images and corresponding to the first parallax configuration, wherein the at least one parallax setting parameter includes a distance between two image-taken positions of the first image and the second image, respectively;
determine whether the value is within a pre-configured range;
when the value is out of the pre-configured range, convert the first parallax configuration into a second parallax configuration;
control the 3D imaging capture device to adopt the second parallax configuration;
use the first image as a reference and the second image as a target to perform a first matching from left to right to obtain a left-to-right parallax;
use the second image as a reference and the first image as a target to perform a second matching from right to left to obtain a right-to-left parallax;
determine a disparity between the left-to-right parallax and the right-to-left parallax;
remove mismatched pixels based on the disparity; and
provided that a pixel $(x_L, y)$ on the left image and a pixel $(x_R, y)$ on the right image are a pair of matching points, the left-to-right parallax is denoted as $d_{LR}(x_L, y)$, and the right-to-left parallax is denoted as $d_{RL}(x_R, y)$, $x_R = x_L + d_{LR}(x_L, y)$, and $\lambda$ is a predetermined threshold value; determine that the matching points $(x_L, y)$ and $(x_R, y)$ are mismatched when $|d_{LR}(x_L, y) - d_{RL}(x_R, y)| \leq \lambda$ is not satisfied.

7. The stereo video capture system according to claim 6, wherein, to control the 3D imaging capture device, the control platform is further configured to:
convert the second parallax configuration into one or more control commands; and
transmit the control commands to the 3D imaging capture device.

8. The stereo video capture system according to claim 6, wherein the 3D imaging capture device is configured to:
receive the control commands from the control platform;
decode the control commands; and
adjust the operation of the 3D imaging capture device using the second parallax configuration.

9. The stereo video capture system according to claim 6, wherein, to calculate, the control platform is further configured to:
determine the parallax between the first image and the second image based on one of a two-view stereo matching algorithm and a multi-view stereo matching algorithm.

10. The stereo video capture system according to claim 6, wherein the control platform is further configured to:
send the first image and the second image to the stereo video monitor for display.

11. The method according to claim 1, wherein the at least one parallax setting parameter includes an angle between a target object to the two image-taken positions of the first image and the second image.

12. The method according to claim 4, wherein the two-view stereo matching algorithm further includes:
selecting a first image feature corresponding to an actual physical structure from the first image;
determining a second image feature corresponding to the same actual physical structure in the second image; and determining a relative position between the first image feature and the second image feature as the parallax between the first image and the second image.

13. The method according to claim 1, further including:
generating, by the control platform, two separate parallax maps $I_{LI}(x, y)$ and $I_{RI}(x, y)$ of $d_{LR}(x_L, y)$ and $d_{RL}(x_R, y)$ for all points from the left image and the right image, respectively;
setting, by the control platform, a value of any mismatched point to zero;
creating, by the control platform, a reference parallax map $I(x, y)$ by integrating the two separate parallax maps images by:

$$I(x, y) = \begin{cases} (1-\alpha)I_{LI}(x, y) + \alpha I_{RI}(x, y) & \text{if } |I_{LI}(x, y) - I_{RI}(x, y)| \leq \delta \\ I_{LI}(x, y) & \text{if } I_{RI}(x, y) \text{ has no matching value} \\ I_{RI}(x, y) & \text{if } I_{LI}(x, y) \text{ has no matching value} \\ 0 & \text{else} \end{cases}$$

wherein $$\alpha = \frac{|t - t_L|}{|t - t_L| + |t - t_R|},$$

$\delta$ is a predetermined threshold, and t is a shifting vector of a outside parameter matrix of the 3D imaging capture device.

14. The method according to claim 13, further including:
calculating, by the control platform, an average parallax among all pixels in a section as:

$$I_{SEG}(x, y) = \underset{(x,y) \in A_{SEG}(x,y)}{\text{median}} (I(x, y))$$

wherein $A_{SEG}(x, y)$ refers the separate section.

* * * * *